(12) United States Patent
Robinson et al.

(10) Patent No.: US 7,765,164 B1
(45) Date of Patent: Jul. 27, 2010

(54) SYSTEM AND METHOD FOR OFFERING IN-LANE PERIODICAL SUBSCRIPTIONS

(75) Inventors: Timothy L. Robinson, Reston, VA (US);
Bradford R. Schildt, Boulder, CO (US);
Tennille V. Goff, Springfield, VA (US);
Daniel J. Corwin, Ashburn, VA (US);
Timothy Neil Watson, Alexandria, VA (US)

(73) Assignee: YT Acquisition Corporation, Delray Beach, FL (US)

( * ) Notice: Subject to any disclaimer, the term of this patent is extended or adjusted under 35 U.S.C. 154(b) by 1538 days.

(21) Appl. No.: 11/076,893

(22) Filed: Mar. 11, 2005

Related U.S. Application Data

(63) Continuation-in-part of application No. 11/005,079, filed on Dec. 7, 2004, now Pat. No. 7,464,059, which is a continuation-in-part of application No. 10/829,448, filed on Apr. 22, 2004, now Pat. No. 7,082,415, which is a continuation-in-part of application No. 10/251,305, filed on Sep. 20, 2002, now Pat. No. 7,269,737.

(60) Provisional application No. 60/324,229, filed on Sep. 21, 2001.

(51) Int. Cl.
*G06Q 20/00* (2006.01)
(52) U.S. Cl. .................... 705/67; 705/16; 713/186
(58) Field of Classification Search .......... 705/16, 705/67; 713/186

See application file for complete search history.

(56) References Cited

U.S. PATENT DOCUMENTS

| | | | |
|---|---|---|---|
| 4,230,214 A | 10/1980 | Cortez | |
| 4,359,631 A | 11/1982 | Lockwood et al. | |
| 4,553,222 A | 11/1985 | Kurland et al. | |
| 4,716,593 A | 12/1987 | Hirai et al. | |
| 4,879,747 A | 11/1989 | Leighton et al. | |
| 4,915,205 A | 4/1990 | Reid et al. | |
| 4,995,081 A | 2/1991 | Leighton et al. | |
| 5,042,073 A | 8/1991 | Collot et al. | |
| 5,086,389 A | 2/1992 | Hassett et al. | |
| 5,144,553 A | 9/1992 | Hassett et al. | |

(Continued)

FOREIGN PATENT DOCUMENTS

EP 0598469 A2 5/1994

(Continued)

OTHER PUBLICATIONS

S. Davies. Touching Big Brother. How Biometric Technology Will Fuse Flesh and Machine. Information Technology & People. vol. 7 (4) 1994.

(Continued)

*Primary Examiner*—Pierre E Elisca
(74) *Attorney, Agent, or Firm*—Pepper Hamilton LLP

(57) ABSTRACT

A system and method of offering subscriptions to periodical publications or other products and services at a point of sale using subscription enabling information stored in a database. The present invention imparts a process by which users enrolled in a biometric authorization system may accept subscription offers at a point of sale by submitting their biometric data. Subscription information stored in the user record may then be utilized to enable the fulfillment of the subscription offer.

21 Claims, 2 Drawing Sheets

U.S. PATENT DOCUMENTS

| | | |
|---|---|---|
| 5,274,695 A | 12/1993 | Green |
| 5,280,527 A | 1/1994 | Gullman et al. |
| 5,289,183 A | 2/1994 | Hassett et al. |
| 5,335,288 A | 8/1994 | Faulkner |
| 5,351,187 A | 9/1994 | Hassett |
| 5,352,876 A | 10/1994 | Watanabe et al. |
| 5,386,104 A | 1/1995 | Sime |
| 5,412,738 A | 5/1995 | Brunelli et al. |
| 5,450,980 A | 9/1995 | Laidlaw |
| 5,453,601 A | 9/1995 | Rosen |
| 5,455,407 A | 10/1995 | Rosen |
| 5,483,601 A | 1/1996 | Faulkner |
| 5,485,510 A | 1/1996 | Colbert |
| 5,523,551 A | 6/1996 | Scott |
| 5,546,523 A | 8/1996 | Gatto |
| 5,581,630 A | 12/1996 | Bonneau, Jr. |
| 5,594,806 A | 1/1997 | Colbert |
| 5,598,474 A | 1/1997 | Johnson |
| 5,602,933 A | 2/1997 | Blackwell et al. |
| 5,613,012 A | 3/1997 | Hoffman et al. |
| 5,615,217 A | 3/1997 | Horne et al. |
| 5,615,277 A | 3/1997 | Hoffman |
| 5,657,389 A | 8/1997 | Houvener |
| 5,679,938 A | 10/1997 | Templeton et al. |
| 5,688,974 A | 11/1997 | Devine et al. |
| 5,696,739 A | 12/1997 | Chang |
| 5,719,950 A | 2/1998 | Osten et al. |
| 5,722,526 A | 3/1998 | Sharrard |
| 5,737,439 A | 4/1998 | Lapsley et al. |
| 5,745,598 A | 4/1998 | Shaw et al. |
| 5,751,973 A | 5/1998 | Hassett |
| 5,764,789 A | 6/1998 | Pare, Jr. et al. |
| 5,790,674 A | 8/1998 | Houvener et al. |
| 5,790,785 A | 8/1998 | Klug et al. |
| 5,799,092 A | 8/1998 | Kristol et al. |
| 5,802,199 A | 9/1998 | Pare, Jr. et al. |
| 5,805,082 A | 9/1998 | Hassett |
| 5,805,719 A | 9/1998 | Pare, Jr. et al. |
| 5,832,464 A | 11/1998 | Houvener et al. |
| 5,838,812 A | 11/1998 | Pare, Jr. et al. |
| 5,845,256 A | 12/1998 | Pescitelli et al. |
| 5,850,442 A | 12/1998 | Muftic |
| 5,857,079 A | 1/1999 | Claus et al. |
| 5,864,623 A | 1/1999 | Messina et al. |
| 5,870,723 A | 2/1999 | Pare, Jr. et al. |
| 5,872,834 A | 2/1999 | Teitelbaum |
| 5,893,075 A | 4/1999 | Plainfield et al. |
| 5,897,616 A | 4/1999 | Kanevsky et al. |
| 5,914,472 A | 6/1999 | Foladare et al. |
| 5,927,544 A | 7/1999 | Kanoh et al. |
| 5,930,804 A | 7/1999 | Yu et al. |
| 5,933,816 A | 8/1999 | Zeanah et al. |
| 5,943,423 A | 8/1999 | Muftic |
| 5,982,914 A | 11/1999 | Lee et al. |
| 5,984,366 A | 11/1999 | Priddy |
| 6,009,411 A | 12/1999 | Kepecs |
| 6,012,039 A | 1/2000 | Hoffman et al. |
| 6,028,950 A | 2/2000 | Merjanian |
| 6,040,783 A | 3/2000 | Houvener et al. |
| D425,800 S | 5/2000 | Shin |
| 6,061,660 A | 5/2000 | Eggleston et al. |
| 6,070,141 A | 5/2000 | Houvener et al. |
| 6,070,147 A | 5/2000 | Harms et al. |
| 6,092,192 A | 7/2000 | Kanevsky et al. |
| 6,094,632 A | 7/2000 | Hattori |
| 6,105,010 A | 8/2000 | Musgrave |
| 6,119,932 A | 9/2000 | Maloney et al. |
| 6,148,091 A | 11/2000 | DiMaria |
| 6,149,055 A | 11/2000 | Gatto |
| 6,154,879 A | 11/2000 | Pare, Jr. et al. |
| 6,157,314 A | 12/2000 | Loftus |
| 6,160,903 A | 12/2000 | Hamid et al. |
| 6,161,059 A | 12/2000 | Tedesco et al. |
| 6,161,090 A | 12/2000 | Kanevsky et al. |
| 6,175,922 B1 | 1/2001 | Wang |
| 6,181,807 B1 | 1/2001 | Setlak et al. |
| 6,192,142 B1 | 2/2001 | Pare, Jr. et al. |
| 6,196,460 B1 | 3/2001 | Shin |
| 6,202,055 B1 * | 3/2001 | Houvener et al. ............. 705/44 |
| 6,222,914 B1 | 4/2001 | McMullin |
| 6,230,148 B1 | 5/2001 | Pare et al. |
| 6,233,564 B1 | 5/2001 | Schulze, Jr. |
| 6,246,751 B1 | 6/2001 | Bergl et al. |
| 6,269,348 B1 | 7/2001 | Pare, Jr. et al. |
| 6,282,658 B2 | 8/2001 | French et al. |
| 6,307,955 B1 | 10/2001 | Zank et al. |
| 6,307,956 B1 | 10/2001 | Black |
| 6,310,966 B1 | 10/2001 | Dulude et al. |
| 6,314,169 B1 | 11/2001 | Schelberg, Jr. et al. |
| 6,317,723 B1 | 11/2001 | Walker et al. |
| 6,317,834 B1 | 11/2001 | Gennaro et al. |
| 6,321,339 B1 | 11/2001 | French et al. |
| 6,327,573 B1 | 12/2001 | Walker et al. |
| 6,330,543 B1 | 12/2001 | Kepecs |
| 6,332,134 B1 | 12/2001 | Foster |
| 6,334,109 B1 | 12/2001 | Kanevsky et al. |
| 6,334,112 B1 | 12/2001 | Walker et al. |
| 6,334,113 B1 | 12/2001 | Walker et al. |
| 6,341,169 B1 | 1/2002 | Cadorette, Jr. et al. |
| 6,345,263 B1 | 2/2002 | Matsumoto et al. |
| 6,363,485 B1 * | 3/2002 | Adams et al. ............... 713/186 |
| 6,366,682 B1 | 4/2002 | Hoffman et al. |
| 6,370,649 B1 | 4/2002 | Angelo et al. |
| 6,381,344 B1 | 4/2002 | Smithies et al. |
| 6,389,401 B1 | 5/2002 | Kepecs |
| 6,397,126 B1 | 5/2002 | Nelson |
| 6,397,198 B1 | 5/2002 | Hoffman et al. |
| 6,405,125 B1 | 6/2002 | Ayed |
| 6,415,262 B1 * | 7/2002 | Walker et al. ................. 705/14 |
| 6,422,464 B1 | 7/2002 | Terranova |
| 6,424,249 B1 | 7/2002 | Houvener |
| 6,433,818 B1 | 8/2002 | Steinberg et al. |
| 6,446,044 B1 | 9/2002 | Luth et al. |
| 6,463,127 B1 | 10/2002 | Maier et al. |
| 6,466,917 B1 | 10/2002 | Goyal et al. |
| 6,470,233 B1 | 10/2002 | Johnson, Jr. |
| 6,470,322 B1 | 10/2002 | Walker et al. |
| 6,477,509 B1 | 11/2002 | Hammons et al. |
| 6,496,595 B1 | 12/2002 | Pucheck et al. |
| 6,497,360 B1 | 12/2002 | Schulze |
| 6,498,970 B2 | 12/2002 | Colmenarez et al. |
| 6,507,912 B1 | 1/2003 | Matyas et al. |
| 6,522,772 B1 | 2/2003 | Morrison et al. |
| 6,523,741 B1 | 2/2003 | DiMaria et al. |
| 6,529,871 B1 | 3/2003 | Kanevsky et al. |
| 6,529,878 B2 | 3/2003 | De Rafael et al. |
| 6,532,459 B1 | 3/2003 | Berson |
| 6,539,282 B2 | 3/2003 | Metcalf et al. |
| 6,542,874 B1 | 4/2003 | Walker et al. |
| 6,554,705 B1 | 4/2003 | Cumbers |
| 6,559,776 B2 | 5/2003 | Katz |
| 6,567,787 B1 | 5/2003 | Walker et al. |
| 6,581,042 B2 | 6/2003 | Pare et al. |
| 6,591,224 B1 | 7/2003 | Sullivan et al. |
| 6,594,376 B2 | 7/2003 | Hoffman et al. |
| 6,636,973 B1 | 10/2003 | Novoa et al. |
| 6,646,568 B2 | 11/2003 | MacPhail et al. |
| 6,647,372 B1 | 11/2003 | Brady et al. |
| 6,650,999 B1 | 11/2003 | Brust et al. |
| 6,651,063 B1 | 11/2003 | Vorobiev |
| 6,653,946 B1 | 11/2003 | Hassett |
| 6,655,585 B2 | 12/2003 | Shinn |
| 6,662,166 B2 | 12/2003 | Pare et al. |
| 6,685,088 B1 | 2/2004 | Royer et al. |

| | | |
|---|---|---|
| 6,694,300 B1 | 2/2004 | Walker et al. |
| 6,695,206 B2 | 2/2004 | Ross |
| 6,715,673 B2 | 4/2004 | Fulcher et al. |
| 6,715,674 B2 | 4/2004 | Schneider et al. |
| 6,748,365 B1 | 6/2004 | Quinlan et al. |
| 6,755,344 B1 | 6/2004 | Mollett et al. |
| 6,792,334 B2 | 9/2004 | Metcalf et al. |
| 6,792,422 B1 | 9/2004 | Stride et al. |
| 6,796,492 B1 | 9/2004 | Gatto |
| 6,796,499 B1 | 9/2004 | Wang |
| 6,827,260 B2 | 12/2004 | Stoutenburg et al. |
| 6,854,642 B2 | 2/2005 | Metcalf et al. |
| 6,865,544 B1 * | 3/2005 | Austin ............... 705/14 |
| 6,873,969 B2 | 3/2005 | Stone et al. |
| 6,886,742 B2 | 5/2005 | Stoutenburg et al. |
| 6,935,559 B2 | 8/2005 | Mollett et al. |
| 6,980,670 B1 * | 12/2005 | Hoffman et al. ............ 382/115 |
| 7,613,631 B2 * | 11/2009 | Walker et al. ................ 705/16 |
| 2001/0000535 A1 | 4/2001 | Lapsley et al. |
| 2001/0011680 A1 | 8/2001 | Soltesz et al. |
| 2001/0025245 A1 | 9/2001 | Flickinger et al. |
| 2001/0034609 A1 | 10/2001 | Dovolis |
| 2001/0042022 A1 | 11/2001 | Kirkpatrick et al. |
| 2001/0047223 A1 | 11/2001 | Metcalf et al. |
| 2001/0047343 A1 | 11/2001 | Dahan et al. |
| 2002/0019811 A1 | 2/2002 | Lapsley et al. |
| 2002/0029196 A1 | 3/2002 | Metcalf et al. |
| 2002/0038165 A1 | 3/2002 | McHale, IV et al. |
| 2002/0046121 A1 | 4/2002 | Walker et al. |
| 2002/0062249 A1 | 5/2002 | Iannacci |
| 2002/0077889 A1 | 6/2002 | Kolls |
| 2002/0077890 A1 | 6/2002 | LaPointe et al. |
| 2002/0077902 A1 | 6/2002 | Marcus |
| 2002/0087413 A1 | 7/2002 | Mahaffy et al. |
| 2002/0091537 A1 | 7/2002 | Algazi |
| 2002/0094111 A1 | 7/2002 | Pucheck et al. |
| 2002/0111917 A1 | 8/2002 | Hoffman et al. |
| 2002/0112177 A1 | 8/2002 | Voltmer et al. |
| 2002/0116266 A1 | 8/2002 | Marshall |
| 2002/0128851 A1 | 9/2002 | Chefalas et al. |
| 2002/0148892 A1 | 10/2002 | Bardwell |
| 2002/0153414 A1 | 10/2002 | Stoutenburg et al. |
| 2002/0161629 A1 | 10/2002 | Jentoft |
| 2002/0162031 A1 | 10/2002 | Levin et al. |
| 2002/0173986 A1 | 11/2002 | Lehew et al. |
| 2002/0178063 A1 | 11/2002 | Gravelle et al. |
| 2002/0194128 A1 | 12/2002 | Maritzen et al. |
| 2002/0196963 A1 | 12/2002 | Bardwell |
| 2003/0006277 A1 | 1/2003 | Maskatiya et al. |
| 2003/0009382 A1 | 1/2003 | D'Arbeloff et al. |
| 2003/0009393 A1 | 1/2003 | Norris |
| 2003/0018522 A1 | 1/2003 | Denimarck et al. |
| 2003/0018567 A1 | 1/2003 | Flitcroft et al. |
| 2003/0034876 A1 | 2/2003 | Pucheck et al. |
| 2003/0046228 A1 | 3/2003 | Berney |
| 2003/0055727 A1 | 3/2003 | Walker et al. |
| 2003/0067396 A1 | 4/2003 | Hassett |
| 2003/0075287 A1 | 4/2003 | Weik |
| 2003/0076417 A1 | 4/2003 | Thomas et al. |
| 2003/0090473 A1 | 5/2003 | Joshi |
| 2003/0105725 A1 | 6/2003 | Hoffman |
| 2003/0144956 A1 | 7/2003 | Yu et al. |
| 2003/0150907 A1 | 8/2003 | Metcalf et al. |
| 2003/0183689 A1 | 10/2003 | Swift et al. |
| 2003/0187790 A1 | 10/2003 | Swift et al. |
| 2003/0187796 A1 | 10/2003 | Swift et al. |
| 2003/0191709 A1 | 10/2003 | Elston et al. |
| 2003/0209599 A1 | 11/2003 | Gatto |
| 2003/0216967 A1 | 11/2003 | Williams |
| 2003/0216987 A1 | 11/2003 | Mollett et al. |
| 2003/0222135 A1 | 12/2003 | Stoutenburg et al. |
| 2003/0229539 A1 | 12/2003 | Algiene |
| 2003/0229540 A1 | 12/2003 | Algiene |
| 2003/0229790 A1 | 12/2003 | Russell |
| 2003/0236704 A1 | 12/2003 | Antonucci |
| 2004/0012481 A1 | 1/2004 | Brusseaux |
| 2004/0020982 A1 | 2/2004 | Hoffman et al. |
| 2004/0024672 A1 | 2/2004 | Brack et al. |
| 2004/0039632 A1 | 2/2004 | Han et al. |
| 2004/0054587 A1 | 3/2004 | Dev et al. |
| 2004/0083172 A1 | 4/2004 | Wiederin |
| 2004/0088232 A1 | 5/2004 | Minnis, Jr. |
| 2004/0088295 A1 | 5/2004 | Glazer et al. |
| 2004/0143505 A1 | 7/2004 | Kovach |
| 2004/0155101 A1 | 8/2004 | Royer et al. |
| 2004/0158524 A1 | 8/2004 | Anderson et al. |
| 2004/0192434 A1 | 9/2004 | Walker et al. |
| 2004/0201520 A1 | 10/2004 | Flick |
| 2004/0215565 A1 | 10/2004 | Huffman |
| 2004/0254840 A1 | 12/2004 | Slemmer et al. |
| 2005/0010478 A1 | 1/2005 | Gravelle |
| 2005/0055582 A1 | 3/2005 | Bazakos et al. |
| 2005/0144133 A1 | 6/2005 | Hoffman et al. |

FOREIGN PATENT DOCUMENTS

| | | |
|---|---|---|
| EP | 0762261 A2 | 3/1997 |
| JP | 358044583 A | 3/1983 |
| WO | WO 01/20525 A1 | 3/2001 |

OTHER PUBLICATIONS

Lawrence Aragon. Show me some ID. PC Week Online (http://www.zdnet.com/pcweek/0112/12bio.html) Jan. 1998.

Gerald Lazar. Agencies Scan Biometrics for Potential Applications. FCW.com (http://www.fcw.com.pubs.few.1997/0120/feature.htm) Jan. 1997.

Comparison of Biometric Identification Methods. http://www.and.nl/id/gen_biom.html. Dec. 1998.

The Speech Recognition API (SRAPI) Committee Announces Support for Speaker Verification. http:/www.srapi.com/svapipr.html. Oct. 1996.

New Technology Enables Computers to Identify, Verify User Voices. http://www.srapi.com/savpi/pr041597.html. Apr. 1997.

Accounting 5544. Biometric Technology. http://acctserver.cob.vt.edu/faculty.jhicks/acct5544/present/ddeverea.htm. Apr. 1997.

Vault FAQs. http://www.ImagineNation.com/Xanadu/Vault. Jun. 1997.

John Daugman. The Scientific Basis for Iris Recognition. Http://www.iriscan.com/basis.htm. Dec. 1998.

Electronic Banking 1. http://www.sjb.co.uk/ebl.html. Aug. 1998.

Biometric Technology Today (Btt). vol. 6(5) Sep. 1998.

Biometric Digest. Mar. 1998.

Biometrics in Human Services. vol. 2(1) Feb. 1998.

"The Biometric Bar Tab Project." http://www.csee.wvu.edu/~wise/biometric/index.htm, including Dec. 9, 2002 Proposal and May 5, 2003 Team Report.

Office of NYS Attorney General Eliot Spitzer. Financial Giant Joins Fight Against Online Gambling. Press Release. http://www.oag.state.ny.us/press/2002/jun/jun14a_02.html. Jun. 2002.

Zions Bank. Cards for Any Business Occasion. http://www.zionsbank.com/bank_cards.jsp?leftNav=bf_bfinance&topNav=bfinance.

ABSA. Purchasing Credit Card. http://www.absa.co.za/Corporate/0,2999,2210,00.html.

Visa U.S.A. Visa Purchasing. http://www.usa.visa.com/corporate/corporate_solutions/payment/visa_purchasing.html?it=cl/corporate/corporate_solutions/index%2Ehtml|Visa%20Purchasing%20.

University of Wisconsin-Green Bay. Purchasing Department: Purchasing Card. http://www.uwgb.edu/Purchasing/purchasingCard/procurement07.htm.

Reference Guides Glossary Terms (Online Glossary Terms and Definitions). Merchant Glossary: Merchant Category Code (MCC) (Merchant Category Code) (MCC) Help). http://glossary.reference-guides.com/Merchant/Merchant_Category_Code_MCC/. 2003.

University of Denver. Purchasing Card User Guide. http://www.du.edu/purchasing/purcard.html#2.%20HOW%20DOES%20THE%20CARD%20WORK?.

Williams College Controller's Office. Purchasing Card Procedures. http://www.williams.edu/admin/controller/pcard.html#whatis. Jan. 2005.

Arizona State University. The Purchasing Card: A Guide for Users. http://www.asu.edu/purchasing/pdf/purchcard.pdf. Jan. 2005.

Washington Post—For Dining In, Security is the Order of the Day; Post 9/11 Concerns Thwarting Deliverymen: [Final Edition], 2004.

MophoTouch™—Multi-Application Finger Identification in the Palm of Your Hand, Sagem Morpho, Inc., 1999.

Video Insight. http://www.video-insight.com/dvr221.htm.

TMCnet. Cernium Installs Perceptrak Behavrior Recognition Software in Public Parking Garage in Yonkers. http://www.tmcnet.com/usubmit/2003/Dec/1021669.htm. Dec. 2003.

City of Aspen. Parking. http://www.aspenpitkin.coin/depts/61/payanddisplay.cfm.

SmartCity. SmartCity Card Solutions. http://www.coinamatic.com/coinamatic_group/html/apartment_laundry_services/smartcity/Products/p4.html.

TranCore. TransCore Access Control System First to Successfully Combine Biometrics and RFID. http://www.transcore.com/news/news050314.htm. Mar. 2005.

James P. Holmes et al. A Performance Evaluation of Biometric Identification Devices. Sandia Report. Jun. 1991.

IBM Technical Disclosure Bulletin, Title: selective receipt of document elements in an electronic mail system, Issue No. 429, TDB-ACC-No. NNRD429177, Jan. 2000, UK.

* cited by examiner

SYSTEM AND METHOD FOR OFFERING IN-LANE PERIODICAL SUBSCRIPTIONS

This application is a continuation-in-part of application Ser. No. 11/005,079, filed Dec. 7, 2004, now U.S. Pat. No. 7,464,059 which is a continuation-in-part of application Ser. No. 10/829,448, filed Apr. 22, 2004, now U.S. Pat. No. 7,082,415 which is a continuation-in-part of application Ser. No. 10/251,305, filed Sep. 20, 2002, now U.S. Pat. No. 7,269,737 which claims domestic priority from provisional application No. 60/324,229, filed Sep. 21, 2001. Each above-identified application is incorporated by reference herein, in its entirety, for all purposes.

FIELD OF THE INVENTION

This application relates generally to the marketing and selling of subscriptions to a product or service. More particularly, the present invention relates to a system and method for offering a subscription to a periodical publication at a point of sale.

BACKGROUND OF THE INVENTION

Generally, current methods of subscribing to periodical publications are inconvenient for consumers, often requiring the completion and mailing of paper forms, and are thus less likely to entice consumers to subscribe to a publisher's product. Additionally, paper subscription inserts in magazines are often discarded by consumers, resulting in loss of potential subscriptions and large quantities of litter and wasted paper. What is needed is a simpler and more convenient method of offering subscriptions to periodical publications.

SUMMARY OF THE INVENTION

The present invention addresses the aforementioned needs by providing a system and a method for offering a subscription to a periodical publication via a biometric authorization system (BAS). Necessary subscriber information, such as subscriber address, payment information, and the like, is obtained from a database, resulting in a simpler, faster and more convenient way for the user to subscribe to a periodical publication.

BRIEF SUMMARY OF THE DRAWINGS

In order to describe the manner in which the above-recited and other advantages and features of the invention can be obtained, a more particular description of the invention briefly described above will be rendered by reference to specific embodiments thereof that are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

Figure 1:
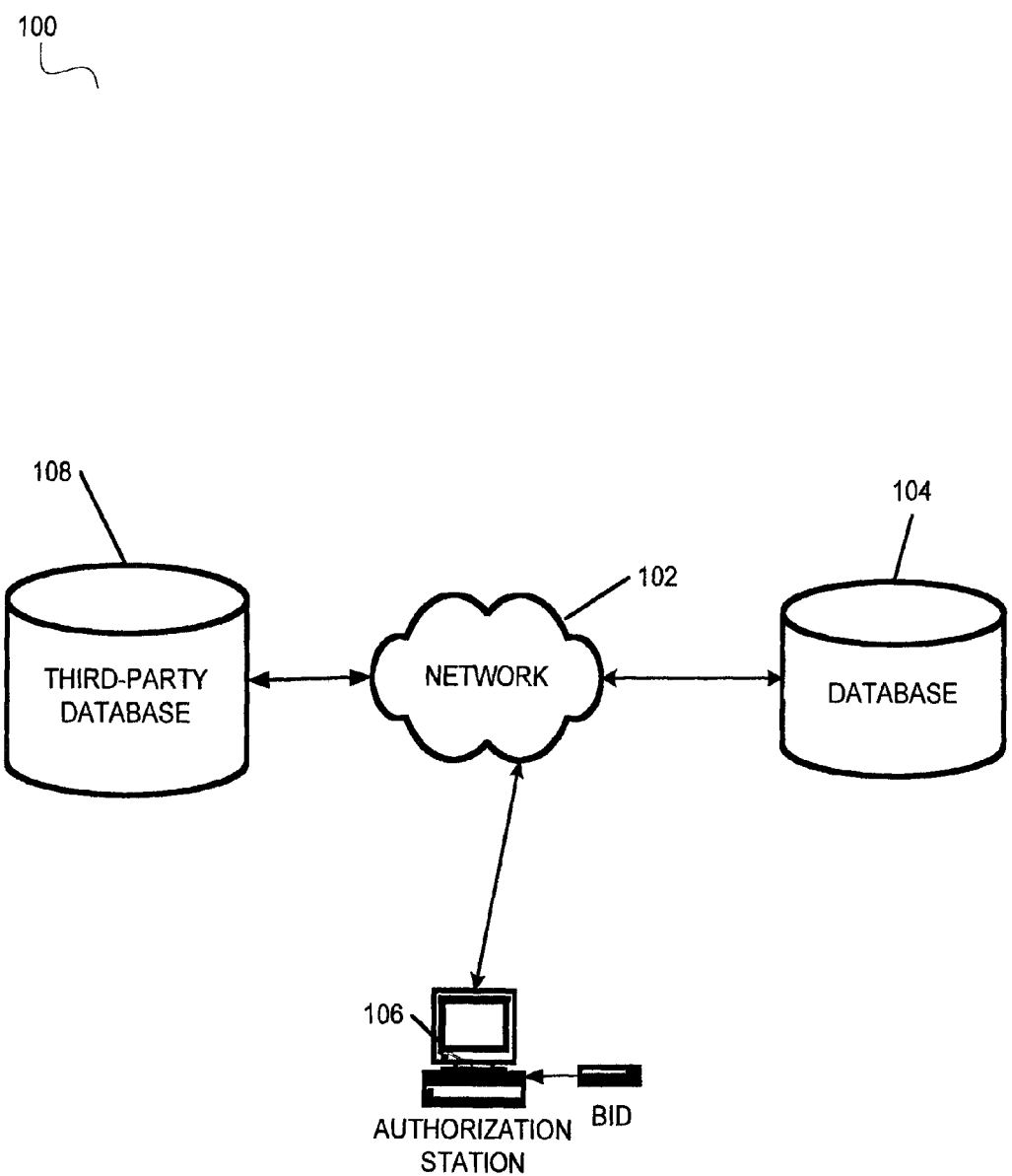
FIG. 1 illustrates a general architecture overview of a biometric authorization system.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Methods of subscribing to periodical publications have generally required that the subscriber complete and return a paper subscription form. Subscription order forms are often delivered in the form of "blow-in" inserts in the periodicals which are often dropped or discarded, producing excess wasted paper and inconvenience for the consumer. Moreover, present systems that envision in-lane subscriptions still require that a user complete a subscription form or otherwise submit subscription-enabling information at the point of sale. Subscription methods that require an investment of user time to submit required information, particularly at a point-of-sale, are less likely to attract new subscribers. Additionally, the cover price of a single issue of a periodical publication may be a significant percentage of the subscription rate, meaning that a consumer who buys multiple single issues of a periodical publication may pay more than a subscriber for fewer issues.

The present invention offers a significant advantage to publishers of periodicals and potential subscribers, since users of a BAS may already have the necessary subscription information stored in a database. It is a feature of the present invention that the user may accept a subscription offer by providing assent to the offer made at a point of sale. This assent at the point of sale would enable information previously stored in a user record to be utilized by the subscription fulfillment entity to complete necessary subscription processing for the user. The user is not required to complete or mail paper subscription cards, and neither the point of sale attendant nor the fulfillment entity has to process or enter large amounts of subscription information, offering savings in time and labor costs. Additional advantages include reductions in the costs of collections for publishers and fulfillment entities and more timely commencement of subscriptions.

Another advantage of the present invention is that it allows publishers to target subscription offers to consumers who are already interested in their product at a time when the consumer is making a positive purchase decision, increasing the likelihood that a consumer might consider additional offers. The system might also enable publishers to market their publications more narrowly to consumers who are making purchases at an establishment related to the subject matter of the publication. For example, a user paying for a product or service at a beauty salon might be offered a discounted subscription to a health and beauty magazine, or a user making a purchase at a health club might be offered a subscription to a fitness magazine. Consumers who occasionally purchase single issues of a magazine would also benefit from the present invention, since the cost of individual issues an a per issue basis is much higher than that of a subscription. In one embodiment, the system can be configured to include the price of a periodical publication purchased at the point of sale in the subscription sale price, in effect discounting the price of the initial periodical by making it the first issue of the subscription.

In general, a biometric authorization refers to an authorization in which either a user, an operator, such as a merchant or clerk, or an agent, such as an employee of the BAS, provides biometric data to be matched against a biometric record in a database. For example, a user may undergo biometric authorization to complete a financial transaction or to gain access to an age-restricted product. As would be appreciated, the location of the database as well as the specific mechanism by which the biometric data is matched to a particular biometric record would be implementation dependent and would not be limiting on the scope of the present invention. Thus, in a biometric authorization, the biometric data taken during the authorization can be matched against registered biometric data at a location where the registered biometric data is stored or where the authorization biometric data is gathered. In addition, biometric data received during an authorization may be tested for liveness to prevent system fraud. Alternatively, the BAS may provide non-biometric access for users who have nonviable biometric data or for users who wish to employ the BAS without the use of biometric data.

Additionally, the principles of the present invention are not limited to using one form of biometric. For example, the biometric data referred to throughout this description can represent a biometric image (or sample) and/or a mathematical representation of the biometric image, often referred to as a biometric "template". In one example, a biometric template can represent any data format that includes feature, positional, or other representing information of characteristics of biometric data. Alternatively, a template may be a mathematical representation of more than one biometric. For example, a user template may be generated from biometric data acquired from two individual fingers, such as a thumb and index finger, or from a finger and an iris scan. The biometric data may include fingerprint data, iris data, facial data, voice data, retinal data, hand architecture data, DNA data, or any other physical measurement pertaining to a user's person.

FIG. 1 illustrates a general architecture overview of BAS 100. As will be described in greater detail below, BAS 100 enables a convenient subscription process to a periodical publication for users enrolled in a BAS. Transaction information is stored in database 104 where user records are stored. Database 104 may represent one or more databases utilized within the system. In one embodiment, database 104 is a central database to which all user records are stored and from which user records are accessed for biometric authorization and/or subscription fulfillment. In another embodiment, database 104 also includes one or more operator databases to which a select set of operator records are stored and from which a select set of operator records are accessed for biometric authorization and subscription information if needed, such as in a case where the operator earns commissions on subscriptions. In an additional embodiment, BAS 100 may also utilize a combination of central databases and one or more operator databases. In general, embodiments utilizing a combination of databases enable increased control of information flow throughout BAS 100. As described in detail below, various examples of information flow configurations within the system can include "open," "closed," and "selectively shared" system models. In still further embodiments, database 104 can further comprise one or more sub-databases that are contained within a particular database. In such embodiments, user data, operator data, and other system data may be distributed across multiple databases within database 104.

In one embodiment, a user record can be designed to include user biometric information, subscription fulfillment information, and other identity verifying information related to an individual seeking biometric authorization within the system. The information held in such a record may include, by way of illustration and without limitation, a user's government identification number(s) and corresponding state(s) of issue, home address, email address, a telephone number, and at least one biometric record. When enrolling in BAS 100, a user may present any number of identity verifying documents or testaments to his identity depending on the implementation of the biometric system. By way of illustration and not of limitation, examples of such documents or testaments include a financial token, a digital image, a video clip, family information, or a DNA sample. Depending on the particular implementation, a user record can also include financial account information, user demographic and marketing information, and/or a user identifier, such as an SID.

An operator record can be designed to include information useful for authenticating an operator, such as a name or ID number, device ID numbers associated with the operator, an address, and a phone number. An operator may be an individual or entity that has administrative capabilities in a BAS, but is not directly employed by the BAS. These capabilities may range from being permitted to oversee a biometric authorization to having access to user records. For example, in the present invention, an operator may be a store clerk or a merchant. In an alternate embodiment of the present invention, the operator records also include employer information if the operator is an employee of an employer who is also an operator. In another embodiment of the present invention, operator records includes an operator identifier, such as an SID, and/or operator biometric data. In one scenario, an operator may need to undergo biometric authorization before administering a user's biometric authorization.

Database 104 and third-party database 108 are connected to network 102, which may be, but is not limited to, the Internet. Network 102 comprises connections to at least one authorization station (AS) 106 where a system user may be biometrically authorized. AS 106 may include, but is not limited to, at least one attached biometric input device (BID) and the necessary means for sending and receiving information to and from a system user and to and from a database. These stations include but are not limited to a vending machine, a kiosk, a personal computer, a user service desk, a point of sale terminal, a telephone, and a wireless device connected via a wireless network. The BID is illustrated in FIG. 1 as a peripheral device for purposes of emphasis only. AS 106 could also include an integrated BID. Networks used in additional embodiments include local area networks (LANs), wide area networks (WANs), and telephone networks.

Additional embodiments of the system also comprise connections to one or more third party information sources, such as third-party database 108, in which user information, including user biometric data, is verified and/or from which system user information, such as subscription information, is retrieved. In an additional embodiment, the system may be connected to one or more financial sources in order to facilitate financial transactions. For example, a user record stored at database 104 may indicate an account held at a financial institution that is to be debited during a biometrically authorized purchase.

Information transferred in the system may be encrypted. For example, information may be encrypted at one point and sent across a non-secure connection between points or not encrypted at a point of communication and sent to the other point of communication across a secure connection. Encryption and decryption of these messages may be monitored by services provided by a security company such as VeriSign. In one scenario, as an added level of security, information internal to a terminal and which is never transmitted may also be encrypted. This prevents retrieval of sensitive information (e.g., biometric data) from a stolen terminal. In an additional embodiment, the system incorporates one or more anti-tampering methods by which to recognize authentic and non-authentic system requests.

In one embodiment, the system is configured as an "open" system, where all information entered into the system is transmitted to and stored in database 104. An open system allows authorization at any AS 106 in the system because an open system shares user information stored in database 104 with all stations.

In an alternate embodiment, the system is configured as a "closed" system, where information entered into the system via a specific operator AS is transmitted to and stored in database 104 specific to that operator, and this information is not shared with another AS or other databases. This is referred to as a "closed" system because users need to enroll in the database in which they would like to perform biometric authorizations. Database 104 in closed systems may communicate with other databases, such as third-party database 108. However, all user information that is enrolled into a particular database is stored in that database. In an alternate embodiment of the closed system, information is stored in a partitioned database 104. Operator related information is stored in operator-specific partitions and is closed to all other operators. Only an authorized operator and authorized entities, such as an agent, may access that partition of database 104. In yet an additional embodiment, information stored in one database or database partition may be stored in another database or database partition. Such an embodiment is useful for information protection in the event database information is lost.

In a further embodiment of the present invention, user information is "selectively shared" and stored in select system multiple-operator databases or select system multiple-operator partitions within database 104. In this embodiment, a group of operators share data with each other and they can choose whether or not to share system information with other operators within the system. This system allows a chain of operators owned by the same entity or linked in some other manner to share information amongst them without sharing that information with all other non-designated operators registered in the system. Information in such a system may be shared between one or more databases freely or sharing may be monitored by rules set in the one these databases or a combination thereof. By way of illustration and not as a limitation, one operator might only want to share user authorization information with one of five operators in a multi-verifier system or all operators might not want to send or store user authorization information to database 104. Such a system allows operators greater control over information flow while still allowing various user conveniences, such as being able to undergo biometric authorization at any store in a selectively shared chain.

The configuration of the system as an "open" system, "closed" system, or "selectively shared" system illustrates various ways of implementing the principles of the present invention. System configuration might be determined by the system in which user information is used. For example, a merchant who is an operator in the system and who conducts biometrically authorized customer loyalty programs might have a system configured with his own database. In this system configuration, the merchant's database files only exist on the database and are retrieved or accessed for biometric authorization only by pre-determined stations connected to the database; therefore, the system would be a "closed" system.

Figure 2:
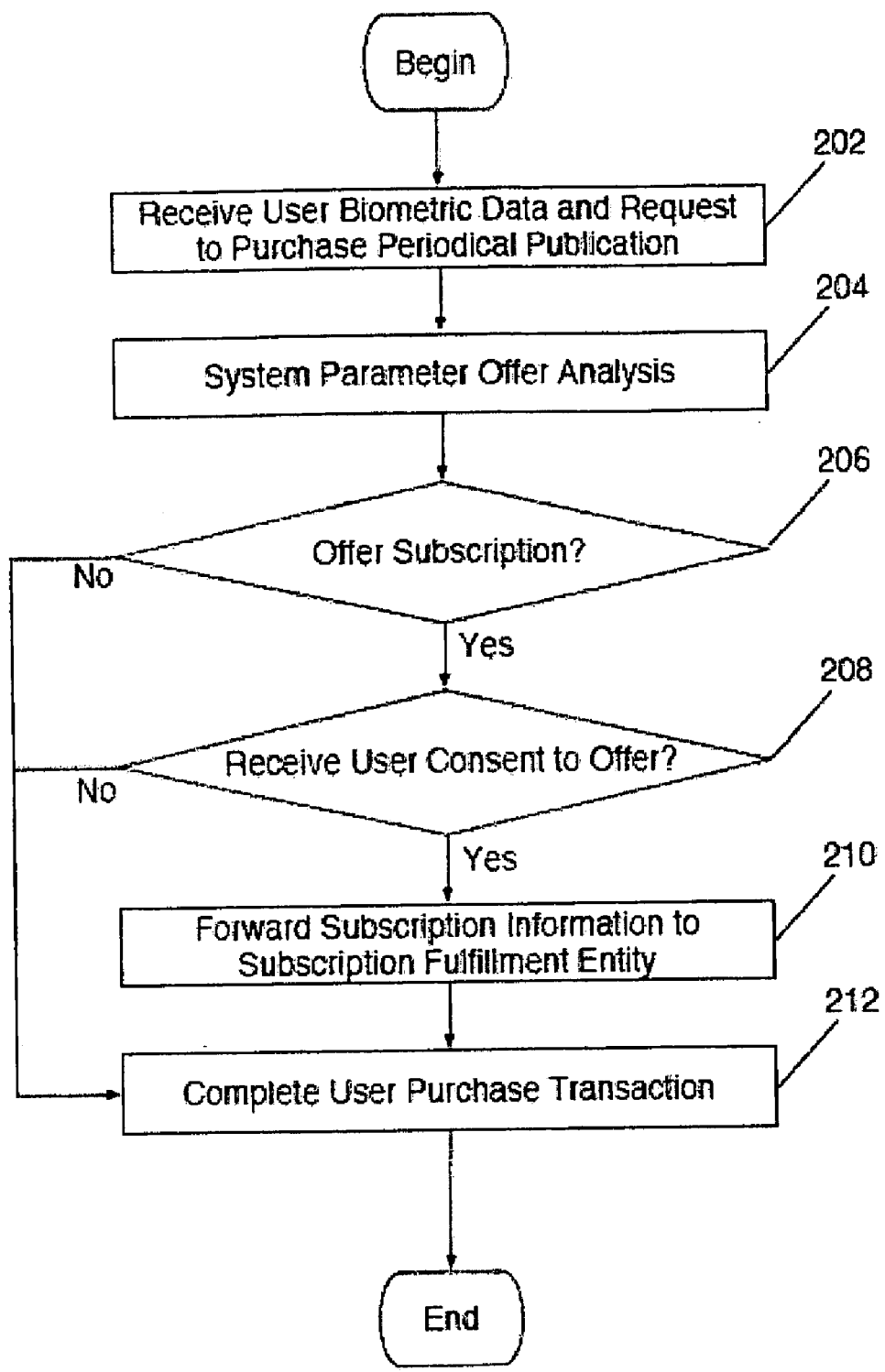
FIG. 2 illustrates a flowchart of a process of offering a subscription to a periodical publication at a point of sale.

FIG. 2 illustrates a process for offering a subscription to a periodical publication or publications at a point of sale. At step 202, a user initiates a purchase of one or more periodical publications at AS 106, which may be for the purpose of illustration and not as a limitation, a point of sale terminal at a merchant or vendor location, the purchase including the submission of user biometric data. Alternatively, a user with nonviable biometric data may submit non-biometric transaction authorizing information, if enabled to do so by the system.

At step 204, BAS 100 analyzes various offer determining parameters. Based on this analysis, a determination is then made at step 206 as to whether a subscription offer is to be made. In one embodiment, an offer might be made any time that a periodical publication is presented for purchase, provided that a subscription offer from a publisher or subscription fulfillment entity for that publication is available. In another embodiment, the offer might be communicated only if one or more conditions are met. For example, a user might indicate in his user record a willingness to receive additional benefits or offers, or might have expressed an explicit interest in subscription offers. BAS 100 might additionally be able to access information about the user's buying history, including purchases made at other merchant locations affiliated with the system, and determine that a subscription offer is warranted based on a review of this history.

In an additional embodiment, the system might target users for subscription offers based on user membership in affiliation groups registered with the system. For example, a member of the chamber of commerce who lists this affiliation with BAS 100 might be offered a subscription to *Business Week*. The system might additionally target subscription offers to users based on the type of product or service purchased at the point of sale, or the nature of the establishment where the transaction takes-place. For example, a user making a purchase via BAS 100 at a Williams and Sonoma store might be offered a subscription to *Cooking Light or Bon Appetit*.

If it is determined at step 206 that an offer is not to be made, then the purchase transaction is completed at step 212. Conversely, if it is determined at step 206 that an offer is to be made, then an offer is communicated to the user. This offer can be for a subscription to one or more periodical publications, including but not limited to the publication presented by the user for purchase. In one embodiment, the offer may be communicated by an operator, such as a merchant or merchant employee. In another embodiment, the offer may be communicated via a display device at AS 106. The subscription offer or offers might include terms, such as duration of the subscription, subscription cost, cancellation and renewal rules, discounts, offers of two subscriptions for the price of one, and the like. In an additional embodiment, the subscription offer(s) may include periodical publications other than the one presented by the user at AS 106, as determined by system parameters.

At step 208, the user accepts or rejects the subscription offer(s). In one embodiment, the user decision is communicated to an operator. In another embodiment, the user makes a selection from a display or keypad connected to AS 106. The user may also be asked to re-submit biometric data as a means of expressing his acceptance to the offer.

If the user accepts the subscription offer at step 208, then user information, stored in database 104 or third-party database 108 in association with a user record, is forwarded by the system to a subscription fulfillment entity at step 210. The user's subscription information may include home address, full name, financial account and payment information, and other information, such as demographic or marketing data, that the user has opted to make available through the system. The user might additionally have more than one address with the system, for example, a business and a home address, and might be able to designate the appropriate address for delivery of the subscription. The subscription fulfillment entity might be the publisher of the periodical publication, or it might be a wholesaler or fulfillment house that acts as an intermediary agent between publishers and subscribers. If the user declines the subscription offer at step 208, then the transaction is completed and the purchase is processed at the point of sale at step 212. In one embodiment, BAS 100 might note the user's decision to decline the offer in the user record or compile a statistical database of user responses.

At step 212, the user purchase transaction is completed. In one embodiment, the user authorizes payment for the cost of the periodical publication or publications and any additional subscription costs to the merchant at AS 106. The cost of the initially purchased periodical publication might further be included in or deducted from the subscription price. In another embodiment, the initial issue is presented by the user as a means of providing subscription information only, and is not purchased. For example, a user may wish to purchase a gift subscription for a third party and present an issue of the desired publication as a means of enabling the subscription, but not wish to purchase the issue, in which case the user might also provide necessary contact or subscription enabling information about the third party. The user might additionally present an issue for enabling a renewal of an existing subscription, rather than for purchase at the point of sale. In an additional embodiment, the user may be billed by the subscription fulfillment entity for the cost of the subscription at a later date, or make multiple payments in agreed-upon installments. In one embodiment, the merchant and/or BAS 100 might collect a fee, such as a flat fee, a percentage of the subscription price, or a combination of the two. If the merchant collects payment for the subscription, the fee might be included in the subscription price, or deducted from the amount forwarded by the merchant to a subscription fulfillment entity. If payment collection is deferred, the fee might be remitted to the merchant by the subscription fulfillment entity when the user's subscription payment is processed.

In another embodiment, the user may be offered the option to defer a decision on the subscription offer and to accept the offer at a time subsequent to the transaction by visiting a system website or AS 106. The user might also be offered the option of purchasing additional subscriptions at a discounted rate by navigating to a system website and entering, for example, an offer code. Alternatively, the system might maintain information relating to the user's eligibility for special subscription offers and/or discounts as part of his user record.

The user might also be offered the option of purchasing a subscription to a periodical publication as a gift for a third party. The offered subscription might be to the purchased periodical or to any periodical selected from a list of eligible purchases. The user might provide contact information relating to the third party at the point of sale, such as the third party's email address. Additionally, the user might enable a gift subscription for a third party who is also enrolled in BAS 100 merely by providing third party identifying information, such as his user identifier, name, or telephone number. In another embodiment, the user might be provided with a gift card containing instructions for activating the gift subscription, which the user might deliver to the third party. By way of illustration and not as a limitation, the gift recipient might be directed by an email or the gift card to a website, including but not limited to a website operated by BAS 100, for entry of an authorization code and other subscription-enabling information. In an additional embodiment, unactivated gift cards might be available in a store location, for example, a magazine rack. The user might present the unactivated gift card at a point of sale for purchase and activation. As additional features, the gift card might be customizable with a photograph of the user, a photograph submitted by the user, or of the item subscribed to; the gift card might be delivered to the gift recipient. BAS 100 might be enabled to notify the user via email when the subscription is fulfilled by the gift recipient.

In an additional embodiment, the user's record might be enabled to store information about other users or non-users, such as a gift list, including subscription information, enabling the user to select a gift subscription for a third party or third parties listed in his user record. In another embodiment, the system might be enabled for an Internet connection at AS 106, providing user with a means to locate available third party information by means of online search services, such as Google or Internet "white pages." Non-enrolled third parties might additionally be offered incentives for enrollment in BAS 100.

In one embodiment, BAS 100 is enabled to communicate with users who accept the subscription offer. For example, BAS 100 might receive and update user subscription information, such as renewals, extensions, cancellations, renewal reminders and authorizations or changes of address, via BAS 100 or at any access point connected to the Internet. If the user or gift recipient updates a change of address, a renewal, or a cancellation with BAS 100, such information might be forwarded to subscription providers affiliated with the system. Similarly, BAS 100 might be enabled to communicate with a user or gift subscription recipient, via email for example, concerning subscription information, such as starting and ending dates, renewal reminders, authorizations, changes of address, a listing of other available periodical publications and the like. Additionally, the user might communicate a refund request to the system, or have a refunded portion of the subscription value donated to a selected charity. BAS 100 might also be enabled to deliver a personal message from the user to a gift subscription recipient.

In another embodiment, BAS 100 might offer subscriptions to products and services other than periodical publications. Such subscription offers might include any product for which a purchaser of a single unit might wish to obtain a subscription. For example, the user purchasing a single bouquet might be offered an opportunity to subscribe to monthly flower deliveries, or, when purchasing a DVD, be offered an opportunity to subscribe to a DVD rental or delivery service, such as NetFlix. Such a subscription might be occasional, with BAS 100 prompting the user according to stored parameters or information. For example, a user might purchase a birthday, anniversary or holiday flower subscription, store names and dates of recipients with BAS 100, and receive communications from the system reminding the user of upcoming special occasions for which he might wish to have flowers delivered.

A system and method of offering a subscription to a periodical publication or other products and services at a point of sale has been illustrated. It will be appreciated by those skilled in the art that the system and method of the present invention can be used to perform point of sale subscription offers in a biometric authorization system. It will thus be appreciated by those skilled in the art that other variations of the present invention will be possible without departing from the scope of the invention disclosed.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention. Therefore, the above description should not be considered to be exclusive of these other embodiments. Also, it is to be understood that the phraseology and terminology employed herein are for the purposes of description and should not be regarded as limiting.

What is claimed is:

1. A method for offering a subscription to a periodical publication via a biometric authorization system, the method comprising:

receiving, at a point-of-sale, a request for purchase of one or more periodical publications;

retrieving, from a subscription offer database accessible via the biometric authorization system, subscription offer information for one or more periodical publications based on identifying information included in said received request;

offering the user, at said point-of-sale, a subscription to one or more of said periodical publications based on said retrieved subscription offer information, said offer including one or more subscription terms;

receiving, via a biometric input device, user biometric data;

comparing, via a processor, said received biometric data to biometric data stored in association with a user record, wherein acceptance of said subscription offer is based at least in part on a successful matching of said biometric data in said comparison;

retrieving, via the processor, user information from said user record; and automatically communicating, via the processor, said user information to a subscription fulfillment entity for processing of one or more subscriptions by said user to said periodical publications, thereby enabling said subscription to be processed without said user providing said retrieved user information at said point-of-sale.

2. The method of claim 1, wherein the biometric authorization system is operated by a third party.

3. The method of claim 1, wherein said acceptance is based on said successful matching only.

4. The method of claim 1, wherein said acceptance is based on a further indication of acceptance by said user at said point-of-sale.

5. The method of claim 1, further comprising processing payment of said subscription offer through the biometric authorization system.

6. The method of claim 1, wherein said subscription terms comprise one or more of a designated starting issue, a period of time, billing options, remittance options, renewal terms, cancellation terms, delivery suspension options and a subscription price.

7. The method of claim 6, wherein said designated starting issue is the issue purchased by the user at the point of sale.

8. The method of claim 7, wherein the paid purchase price of said issue is deducted from said subscription price.

9. The method of claim 6, wherein the user remits said subscription price at one or more later dates.

10. The method of claim 1, wherein said user information comprises one or more of user name, mailing address, phone number, email address and payment information.

11. The method of claim 1, wherein said user information comprises user demographic and marketing information.

12. The method of claim 1, wherein said subscription fulfillment entity is one of a publisher, periodical publication wholesaler, or subscription fulfillment house.

13. The method of claim 1, wherein said user accepts said subscription offer subsequent to the point of sale transaction.

14. The method of claim 1, wherein the user receives one or more notifications from the subscription fulfillment entity.

15. The method of claim 14, wherein a notification of said one or more notifications comprises one or more of a subscription terms change, a subscription renewal reminder, a subscription benefit offer, and a transaction verification message.

16. The method of claim 15, wherein said notification is delivered by one or more of email, telephone, wireless communication device, mail, and a point of sale.

17. A method for subscribing to a periodical publication on behalf of a third party by a user enrolled in a biometric authorization system, the method comprising:

presenting, to the user enrolled in the biometric authorization system, an offer of a subscription to a periodical publication, said offer including an indication of a subscription term associated with said periodical publication, wherein the periodical publication is indicated at a point of sale by said user;

receiving, by a processor, an indication of acceptance of said offer as a gift for a third party, said indication including at least the submission of biometric data via a biometric input device from said user and identifying information of said third party; and receiving, by the processor, information for third party enablement of said subscription.

18. The method of claim 17, wherein said third party identifying information includes contact information that enables the biometric authorization system to communicate with said third party.

19. The method of claim 18, wherein the biometric authorization system communicates to said third party via a communication comprising one or more of the following: a notification that a subscription to a periodical publication has been purchased on said third party's behalf, instructions for activating said subscription, the start date of said subscription, the duration of said subscription, an identity of the user purchasing said subscription on behalf of the third party, a personal message from said user purchasing said subscription, a subscription terms change, a subscription renewal reminder, a subscription benefit offer, and a transaction verification message.

20. The method of claim 17, wherein said received information for third party enablement of said subscription comprises a gift card containing instructions for said third party to enable said subscription.

21. The method of claim 20, wherein said subscription is enabled by the receipt of verification information printed on said gift card via a website or authorization station.

* * * * *